United States Patent
Obata et al.

(10) Patent No.: US 6,812,287 B2
(45) Date of Patent: Nov. 2, 2004

(54) PROPYLENE-BASED RESIN COMPOSITION AND HEAT-SHRINKABLE FILM

(75) Inventors: Yoichi Obata, Sodegaura (JP); Takeshi Ebara, Chiba (JP)

(73) Assignee: Sumitomo Chemical Company, Limited, Osaka (JP)

(*) Notice: Subject to any disclaimer, the term of this patent is extended or adjusted under 35 U.S.C. 154(b) by 67 days.

(21) Appl. No.: 10/378,911

(22) Filed: Mar. 5, 2003

(65) Prior Publication Data

US 2003/0216521 A1 Nov. 20, 2003

(30) Foreign Application Priority Data

Mar. 12, 2002 (JP) ........................................ 2002-066618
May 9, 2002 (JP) ........................................ 2002-133800

(51) Int. Cl.$^7$ .............................. B32B 27/00; B08F 8/00; B08L 23/00; B08L 23/04
(52) U.S. Cl. ........................ 525/191; 525/240; 428/221
(58) Field of Search ................. 525/191, 240; 428/221

(56) References Cited

U.S. PATENT DOCUMENTS 6,639,018 B2 * 10/2003 Yunoki et al. ............... 525/191
6,699,574 B2 * 3/2004 Obata et al. ................ 428/221

FOREIGN PATENT DOCUMENTS

| JP | 10-7816 A | 1/1998 |
| JP | 2000-336221 A | 12/2000 |

* cited by examiner

Primary Examiner—Nathan M. Nutter
(74) Attorney, Agent, or Firm—Sughrue Mion, PLLC

(57) ABSTRACT

Disclosed is a resin composition comprising from 20 to 99 parts by weight of a propylene-based polymer A having an $MFR^A$ of from 0.3 to 20 g/10 min and a melting point $Tm^A$ of from 125 to 140° C. and from 1 to 80 parts by weight of a propylene-based polymer B having an $MFR^B$ of from 21 to 200 g/10 min and a melting point $Tm^B$ of from 135 to 170° C., wherein a ratio $Tm^A/Tm^B$ is less than 1, wherein a ratio $MFR^A/MFR^B$ is $0.01<MFR^A/MFR^B<1$ and wherein the resin composition has an MFR of from 0.3 to 20 g/10 min and a melting point of from 130 to 145° C. A heat-shrinkable film obtained by stretching the composition at least uniaxially is also disclosed which is superior in rigidity, heat shrinkage, weld-cut sealability and stretch processability. Incorporation of a nucleating agent improves the transparency of the film.

6 Claims, No Drawings

PROPYLENE-BASED RESIN COMPOSITION AND HEAT-SHRINKABLE FILM

BACKGROUND OF THE INVENTION

1. Field of the Invention

The present invention relates to a propylene-based resin composition and to a heat-shrinkable film using the resin composition. More particularly, the invention relates to a heat-shrinkable film superior in rigidity, heat shrinkage, weld-cut sealability and stretch processability and to a propylene-based resin composition capable of yielding such a heat-shrinkable film.

2. Description of the Related Art

A heat-shrinkable film is, in general, a film that is used in such a manner that a single object to be wrapped or an aggregate comprising a plurality of objects to be wrapped is wrapped with the heat-shrinkable film first and then the film is heated to shrink.

Such a heat-shrinkable is generally required to shrink at a temperature lower than the melting point of the film and to exhibit a high shrinkage. Furthermore, in recent years, the wrapping speed of automatic wrapping machines has been increased. Therefore, a heat-shrinkable film has come to be desired not to cause defective sealing, e.g. pinholes formed in a sealed portion, during weld-cut sealing employed in a wrapping process using an automatic wrapping machine. In addition, a heat-shrinkable film is desired to have a high rigidity and to be superior in stretch processability.

As an approach to improve a pinhole resistance after weld-cut sealing, JP, 10-7816,A discloses a method comprising addition of a nucleating agent to a polypropylene resin. JP, 2000-336221,A discloses a polypropylene resin composition that comprises a polypropylene resin which has an MFR of from 0.3 to 2.5 g/10 min and a flexural modulus of from 500 to 1000 MPa and a polypropylene resin which has a melting point ranging from 135 to 150° C. and being higher than that of the former polypropylene by 5° C. or more, an MFR of from 2.5 to 20 g/10 min and a flexural modulus of from 500 to 1000 MPa.

However, further improvement has been desired in rigidity, heat shrinkage and stretch processability as well as weld-cut sealability.

SUMMARY OF THE INVENTION

An object of the present invention is to provide a heat-shrinkable film superior in rigidity, heat shrinkage, weld-cut sealability and stretch processability and a propylene-based resin composition suitable as a raw material of the heat-shrinkable film. Another object of the present invention is to provide a heat-shrinkable film superior also in transparency in addition to the aforementioned four properties and a propylene-based resin composition suitable as a raw material of the heat-shrinkable film.

In a first aspect the present invention relates to a propylene-based resin composition comprising from 20 to 99 parts by weight of a propylene-based polymer A satisfying requirements (A-1) and (A-2) below and from 1 to 80 parts by weight of a propylene-based polymer B satisfying requirements (B-1) and (B-2) below, provided that the sum of the amounts of the propylene-based polymer A and the propylene-based polymer B is 100 parts by weight, wherein a melting point $Tm^A$ of the propylene-based polymer A and a melting point $Tm^B$ of the propylene-based polymer B satisfy requirement (C) below, wherein a melt flow rate $MFR^A$ of the propylene-based polymer A and a melt flow rate $MFR^B$ of the propylene-based polymer B satisfy requirement (D) below, and wherein the propylene-based resin composition satisfies requirements (E-1) and (E-2) below:

Requirement (A-1): A melt flow rate $MFR^A$ is from 0.3 to 20 g/10 minutes;

Requirement (A-2): A melting point $Tm^A$, which is defined as a peak temperature of a peak with a maximum intensity in a melting curve measured by DSC, is from 125 to 140° C.;

Requirement (B-1): A melt flow rate $MFR^B$ is from 21 to 200 g/10 minutes;

Requirement (B-2): A melting point $Tm^B$, which is defined as a peak temperature of a peak with a maximum intensity in a melting curve measured by DSC, is from 135 to 170° C.;

Requirement (C): A ratio of the melting point $Tm^A$ of the propylene-based polymer A to the melting point $Tm^B$ of the propylene-based polymer B, $Tm^A/Tm^B$, is less than 1;

Requirement (D): A ratio of the melt flow rate $MFR^A$ of the propylene-based polymer A to the melt flow rate $MFR^B$ of the propylene-based polymer B, $MFR^A/MFR^B$, is $0.01 < MFR^A/MFR^B < 1$;

Requirement (E-1): A melt flow rate $MFR^C$ of the propylene-based resin composition is from 0.3 to 20 g/10 minutes; and Requirement (E-2): A melting point $Tm^C$, which is defined as a peak temperature of a peak with a maximum intensity in a melting curve measured by DSC, of the propylene-based resin composition is from 130 to 145° C.

In a second aspect the present invention relates to a heat-shrinkable film obtained by stretching the propylene-based resin composition at least uniaxially. This film is superior in rigidity, heat shrinkage, weld-cut sealability and stretch processablity.

In a third aspect the present invention relates to a propylene-based resin composition comprising from 20 to 99 parts by weight of a propylene-based polymer A satisfying requirements (A-1) and (A-2) mentioned previously, from 0.999 to 75 parts by weight of a propylene-based polymer B satisfying requirements (B-1) and (B-2) mentioned previously and from 0.001 to 5 parts by weight of a nucleating agent, provided that the sum of the amounts of the propylene-based polymer A, propylene-based polymer B and nucleating agent is 100 parts by weight, wherein a melting point $Tm^A$ of the propylene-based polymer A and a melting point $Tm^B$ of the propylene-based polymer B satisfy requirement (C) mentioned previously, wherein a melt flow rate $MFR^A$ of the propylene-based polymer A and a melt flow rate $MFR^B$ of the propylene-based polymer B satisfy requirement (D) mentioned previously, and where in the propylene-based resin composition satisfies requirement (E-3) below as well as requirements (E-1) and (E-2) mentioned previously:

Requirement (E-3): A crystallization rate of the propylene-based resin composition is from 1 to 400 seconds.

In a fourth aspect the present invention relates to a heat-shrinkable film obtained by stretching the propylene-based resin composition at least uniaxially. This film is superior in rigidity, heat shrinkage, weld-cut sealability and stretch processablity and also in transparency.

DESCRIPTION OF PREFERRED EMBODIMENTS

First, the propylene-based resin composition of the aforementioned first aspect will be described.

The propylene-based polymer A used in the present invention is a propylene homopolymer or a propylene-based random copolymer. When the propylene-based polymer A used in the present invention is a propylene-based random copolymer, it may be a propylene-based random copolymer obtained by copolymerization of propylene with ethylene and/or at least one comonomer selected from α-olefins having from 4 to 20 carbon atoms.

Examples of the α-olefins having from 4 to 20 carbon atoms include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyle-1-pentene, diethyl-1-butene, 1-nonene, 1-decene, 1-undecene and 1-dodecene. Preferred are 1-butene, 1-pentene, 1-hexene and 1-octene. More preferred are 1-butene and 1-hexene.

Examples of the propylene-based random copolymer used as the propylene-based polymer A in the present invention include propylene-ethylene random copolymers, propylene-α-olefin random copolymers and propylene-ethylene-α-olefin random copolymers. Examples of the propylene-α-olefin random copolymers include a propylene-1-butene random copolymer, a propylene-1-hexene random copolymer and a propylene-1-octene random copolymer. Examples of the propylene-ethylene-α-olefin random copolymers include a propylene-ethylene-1-butene random copolymer, a propylene-ethylene-1-hexene random copolymer and a propylene-ethylene-1-octene random copolymer. Preferred are a propylene-ethylene random copolymer, a propylene-1-butene random copolymer, a propylene-1-hexene random copolymer, a propylene-ethylene-1-butene random copolymer and a propylene-ethylene-1-hexene random copolymer.

When the propylene-based random copolymer used as the propylene-based polymer A in the present invention is a propylene-ethylene random copolymer, the content of ethylene is usually from 1 to 7% by weight, and in view of stretch processability of a resulting propylene-based resin composition or rigidity of a heat-shrinkable film obtained from the resin composition, it is preferably from 2 to 7% by weight, more preferably from 3 to 6% by weight.

When the propylene-based random copolymer used as the propylene-based polymer A in the present invention is a propylene-α-olefin random copolymer, the content of α-olefin is usually from 1 to 30% by weight, and in view of stretch processability of a resulting propylene-based resin composition or rigidity of a heat-shrinkable film obtained from the resin composition, it is preferably from 2 to 28% by weight, more preferably from 3 to 25% by weight.

When the propylene-based random copolymer used as the propylene-based polymer A in the present invention is a propylene-ethylene-α-olefin random copolymer, the content of ethylene is usually from 0.1 to 7% by weight, and in view of stretch processability of a resulting propylene-based resin composition or rigidity of a heat-shrinkable film obtained from the resin composition, it is preferably from 2 to 6% by weight, more preferably from 2 to 4.5% by weight.

When the propylene-based random copolymer used as the propylene-based polymer A in the present invention is a propylene-ethylene-α-olefin random copolymer, the content of α-olefin is usually from 1 to 30% by weight, and in view of stretch processability of a resulting propylene-based resin composition or rigidity of a heat-shrinkable film obtained from the resin composition, it is preferably from 2 to 10% by weight, more preferably from 3 to 7% by weight.

The melt flow rate $MFR^A$ of the propylene-based polymer A used in the present invention is from 0.3 to 20 g/10 minutes (Requirement (A-1)), preferably from 0.5 to 10 g/10 minutes, and more preferably from 0.8 to 7 g/10 minutes.

When a propylene-based polymer having a melt flow rate of less than 0.3 g/10 minutes is used in place of the propylene-based polymer A, a resulting propylene-based resin composition may have a poor flowability or may become liable to form pimples during its extrusion processing. When a propylene-based polymer having a melt flow rate of greater than 20 g/10 minutes is used in place of the propylene-based polymer A, a resulting propylene-based resin composition film may have an insufficient stretch processability.

The propylene-based polymer A used in the present invention has a melting point $Tm^A$, which is defined as a peak temperature of a peak with a maximum intensity in a melting curve measured by DSC, of from 125 to 140° C. (Requirement (A-2)), preferably from 128 to 138° C., and more preferably from 129 to 135° C. When a propylene-based polymer having a melting point of lower than 125° C. is used in place of the propylene-based polymer A, a resulting heat-shrinkable film may have an insufficient rigidity. When a propylene-based polymer having a melting point of higher 140° C. is used in place of the propylene-based polymer A, a resulting polypropylene resin composition may have an insufficient stretch processability.

When the propylene-based random copolymer used as the propylene-based polymer A in the present invention is a propylene-ethylene-α-olefin random copolymer, the amount of a resin which elutes at temperatures not higher than 40° C. in temperature rising elution fractionation using orthodichlorobenzene as a solvent is preferably from 2.5 to 7% by weight, more preferably from 2.5 to 6% by weight, and still more preferably from 4 to 6% by weight in view of stretch processability, bleeding property of additives, such as lubricants and antistatic agents, to a surface of a film, and anti-blocking property of a film.

In the temperature rising elution fractionation, the amount of a resin eluting at temperatures higher than 40° C. but not higher than 100° C. is preferably from 84 to 97.5% by weight, more preferably from 89 to 97.5% by weight, and still more preferably from 94 to 96% by weight in view of heat shrinkage and stretch processability.

Furthermore, in the temperature rising elution fractionation, the amount of a resin eluting at temperatures higher than 100° C. but not higher than 130° C. is preferably from 0 to 9% by weight, more preferably from 0 to 5% by weight, and still more preferably from 0 to 2% by weight in view of stretch processability.

The propylene-based polymer B used in the present invention is a propylene homopolymer or a propylene-based random copolymer. When the propylene-based polymer B used in the present invention is a propylene-based random copolymer, it may be a propylene-based random copolymer obtained by copolymerization of propylene with ethylene and/or at least one comonomer selected from α-olefins having from 4 to 20 carbon atoms.

Examples of the α-olefins having from 4 to 20 carbon atoms are α-olefins such as those used in the case where the aforementioned propylene-based polymer A is a propylene-based random copolymer obtained by copolymerization of propylene with ethylene and/or at least one comonomer selected from α-olefins having from 4 to 20 carbon atoms. Preferred are 1-butene, 1-pentene, 1-hexene and 1-octene. More preferred are 1-butene and 1-hexene.

Examples of the propylene-based random copolymer used as the propylene-based polymer B in the present invention are the same as those of the propylene-based random copolymer used as the propylene-based polymer A. Preferred are a propylene-ethylene random copolymer, a propylene1-butene random copolymer, a propylene-1-hexene random copolymer, a propylene-ethylene-1-butene random copolymer and a propylene-ethylene-1-hexene random copolymer.

In addition, propylene homopolymers are also used preferably as the propylene-based polymer B.

When the propylene-based random copolymer used as the propylene-based polymer B in the present invention is a propylene-ethylene random copolymer, the content of ethylene is usually up to 6% by weight, and in view of rigidity of a heat-shrinkable film obtained from the resin composition, it is preferably up to 5% by weight, more preferably up to 4% by weight.

When the propylene-based random copolymer used as the propylene-based polymer B in the present invention is a propylene-α-olefin random copolymer, the content of α-olefin is usually up to 30% by weight, and in view of rigidity of a heat-shrinkable film obtained from the resin composition, it is preferably up to 28% by weight, more preferably up to 25% by weight.

When the propylene-based random copolymer used as the propylene-based polymer B in the present invention is a propylene-ethylene-α-olefin random copolymer, the content of ethylene is usually up to 6% by weight, and in view of rigidity of a heat-shrinkable film obtained from the resin composition, it is preferably up to 5% by weight, more preferably up to 4% by weight.

When the propylene-based random copolymer used as the propylene-based polymer B in the present invention is a propylene-ethylene-α-olefin random copolymer, the content of α-olefin is usually not more than 30% by weight, and from the viewpoint of rigidity of a heat-shrinkable film obtained from the resin composition, it is preferably not more than 10% by weight, more preferably not more than 7% by weight.

The melt flow rate $MFR^B$ of the propylene-based polymer B used in the present invention is from 21 to 200 g/10 minutes (Requirement (B-1)), preferably from 21 to 150 g/10 minutes, and more preferably from 22 to 130 g/10 minutes.

When a propylene-based resin having a melt flow rate of less than 21 g/10 minutes is used in place of the propylene-based polymer B, a resulting heat-shrinkable film may have an insufficient rigidity. When a propylene-based resin having a melt flow rate of greater than 200 g/10 minutes is used in place of the propylene-based polymer B, a resulting propylene-based resin composition for a stretched film may have a poor stretch processability.

The propylene-based polymer B used in the present invention has a melting point $Tm^B$, which is defined as a peak temperature of a peak with a maximum intensity in a melting curve measured by DSC, of from 135 to 170° C. (Requirement (B-2)), preferably from 140 to 167° C., and more preferably from 150 to 166° C. When a propylene-based resin having a melting point of lower than 135° C. is used in place of the propylene-based polymer B, a resulting polypropylene stretched film may have an insufficient rigidity. In general, it is difficult to produce propylene-based polymers having a melting point higher than 170° C.

The amount of a 20° C. xylene-soluble fraction (CXS) of the propylene-based polymer (B) used in the present invention is preferably up to 4% by weight, and more preferably up to 3% by weight in view of rigidity and anti-blocking property of a resulting heat-shrinkable film.

The content of the propylene-based polymer A in the propylene-based resin composition of the present invention is from 20 to 99 parts by weight, provided that the sum of the amounts of the propylene-based polymer A and the propylene-based polymer B is 100 parts by weight. Preferably, the propylene-based polymer A accounts for from 25 to 98.5 parts by weight (that is, the propylene-based polymer B accounts for from 1.5 to 75 parts by weight). More preferably, the propylene-based polymer A accounts for from 30 to 98 parts by weight (that is, the propylene-based polymer B accounts for from 2 to 70 parts by weight).

When the amount of the propylene-based polymer A is less than 20 parts by weight (that is, the amount of the propylene-based polymer B is over 80 parts by weight), a resulting propylene-based resin composition may have an insufficient stretch processability. When the amount of the propylene-based polymer A is over 99 parts by weight (that is, the amount of the propylene-based polymer B is less than 1 part by weight), a resulting heat-shrinkable film may have an insufficient rigidity.

In the propylene-based resin composition of the present invention, the ratio of the melting point $Tm^A$ of the propylene-based polymer A to the melting point $Tm^B$ of the propylene-based polymer B, $Tm^A/Tm^B$, is less than 1 (Requirement (C)), preferably from 0.67 to 0.99, more preferably from 0.70 to 0.96, and still more preferably from 0.77 to 0.86. When the ratio of the melting point $Tm^A$ of the propylene-based polymer A to the melting point $Tm^B$ of the propylene-based polymer B, $Tm^A/Tm^B$, is 1 or more, a resulting heat-shrinkable film may have an insufficient rigidity.

In the propylene-based resin composition of the present invention, the ratio of the melt flow rate $MFR^A$ of the propylene-based polymer A to the melt flow rate $MFR^B$ of the propylene-based polymer B, $MFR^A/MFR^B$, is $0.01<MFR^A/MFR^B<1$ (Requirement (D)), preferably $0.015<MFR^A/MFR^B<0.5$, and more preferably $0.018<MFR^A/MFR^B<0.3$. When $MFR^A/MFR^B$ is 0.01 or less, a resulting propylene-based resin composition may have a poor flowability or may become liable to form pimples during its extrusion processing. When $MFR^A/MFR^B$ is 1 or more, a resulting heat-shrinkable film may have an insufficient rigidity.

The melt flow rate $MFR^C$ of the propylene-based resin composition of the present invention containing the propylene-based polymer A and the propylene-based polymer B is from 0.3 to 20 g/10 minutes (Requirement (E-1)), preferably from 0.5 to 15 g/10 minutes, and more preferably from 1 to 10 g/10 minutes. When the melt flow rate of the propylene-based resin composition is less than 0.3 g/10 minutes, the propylene-based resin composition in a molten state will have a high viscosity and this may result in an insufficient flowability at the time of extrusion processing. When over 20 g/10 minutes, formabilities, such as stretch processability, may deteriorate.

The melt flow rate of the propylene-based resin composition of the present invention can be brought within the above-mentioned ranges by adjusting the melt flow rates and the amounts of propylene-based polymer A and propylene-based polymer B to be mixed.

The melting point $Tm^C$ of the propylene-based resin composition of the present invention containing the propylene-based polymer A and the propylene-based polymer B is from 130 to 145° C. (Requirement (E-2)), preferably from 132 to 143° C., and more preferably from 133 to 142° C.

The melting point of the propylene-based resin composition of the present invention can be brought within the above-mentioned ranges by adjusting the melting points and the amounts of propylene-based polymer A and propylene-based polymer B to be mixed.

The amount of a 20° C. xylene-soluble fraction (CXS) of the propylene-based resin composition of the present invention containing the propylene-based polymer A and the propylene-based polymer B is preferably up to 4% by weight, more preferably up to 3.5% by weight, and still more preferably up to 3% by weight in view of simultaneous exhibition of preferable stretch processability, rigidity and heat shrinkage and also from the viewpoint of anti-blocking property.

The process for producing the propylene-based resin composition of the present invention includes a process comprising producing the propylene-based polymer A and the propylene-based polymer B separately and mixing the propylene-based polymer A and the propylene-based polymer B produced separately, and a process comprising producing the propylene-based polymer A and the propylene-based polymer B in different stages by use of multi-stage polymerization having two or more stages.

In the process comprising producing the propylene-based polymer A and the propylene-based polymer B separately and mixing the propylene-based polymer A and the propylene-based polymer B produced separately, the method for producing the propylene-based polymer A and the propylene-based polymer B separately may, for example, be solvent polymerization, which is carried out in the presence of an inert solvent, bulk polymerization, which is carried out in the presence of a liquid monomer, and gas phase polymerization, which is carried out in substantial absence of a liquid medium. Preferred is the gas phase polymerization. Moreover, polymerization methods comprising a combination of two or more polymerization methods mentioned above and multi-stage polymerization having two or more stages may also be applied.

The method for mixing the propylene-based polymer A and the propylene-based polymer B produced separately may be any method as long as it is possible to disperse polymer A and polymer B uniformly. Examples thereof include:

(1) a method comprising mixing polymer A and polymer B with a ribbon blender, a Henschel mixer, a tumbler mixer or the like, and melt kneading the mixture using an extruder or the like;

(2) a method comprising melt kneading and pelletizing separately polymer A and polymer B, mixing the pelletized polymer A and pelletized polymer B by a method the same as that described above, and then further melt kneading;

(3) a method comprising melt kneading and pelletizing separately polymer A and polymer B, blending the pelletized polymer A and pelletized polymer B by dry blending or the like, and then mixing directly with a film processing machine; and (4) a method comprising melt kneading and pelletizing separately polymer A and polymer B, feeding the pelletized polymer A and the pelletized polymer B separately and mixing them.

Furthermore, a method comprising preparing in advance a master batch which comprises 100 parts by weight of the propylene-based polymer B and from 1 to 99 parts by weight of the propylene-based polymer A, and mixing the master batch with appropriate amounts of propylene-based polymers A and B so that the concentration of the propylene-based polymer A becomes a predetermined concentration.

In addition, when the propylene-based polymer A and the propylene-based polymer B produced separately are mixed, antioxidants, lubricants, antistatic agents, anti-blocking agents, various kinds of inorganic or organic fillers, and the like may optionally be added.

In the method of producing the propylene-based polymer A and the propylene-based polymer B separately in different stages using multi-stage polymerization having two or more stages, the method for polymerizing the propylene-based polymer A and the propylene-based polymer B may, for example, be a method comprising an optional combination of two or more stages using, for example, solvent polymerization, which is carried out in the presence of an inert solvent, bulk polymerization, which is carried out in the presence of a liquid monomer, gas phase polymerization, which is carried out in substantial absence of a liquid medium wherein the propylene-based polymer A and the propylene-based polymer B are respectively polymerized in different stages.

A propylene-based resin composition obtained by a method of polymerizing the propylene-based polymer A and the propylene-based polymer B separately in different stages using multi-stage polymerization having two or more stages may be further mixed. The method for further mixing may be a method of melt kneading with an extruder or the like.

As a catalyst used for the polymerization of the propylene-based polymer A and the propylene-based polymer B of the present invention, a stereoregulating catalyst for polymerization of propylene is used both in the case of polymerizing these polymers separately and in the case of using multi-stage polymerization.

Examples of the stereoregulating catalyst for polymerization of propylene include catalyst systems obtained by combining a solid catalyst component such as a titanium trichloride catalyst, a Ti—Mg catalyst essentially comprising titanium, magnesium, halogen and an electron donor with an organoaluminum compound and, if needed, a third component such as an electron donating compound; metallocene catalysts; and the like.

Preferred are catalyst systems obtained by combining a solid catalyst component essentially comprising magnesium, titanium, halogen and an electron donor, an organoaluminum compound and an electron donating compound, specific examples of which include catalyst systems disclosed in JP, 61-218606, 61-287904 and 7-216017,A.

The propylene-based resin composition of the present invention may, as needed, contain an antioxidant. The antioxidant is exemplified by phosphorus-based antioxidants, phenol-based antioxidants and sulfur-based antioxidants. These antioxidants may be used alone or in combination of at least two of them.

Examples of phosphorus-based antioxidants include tris(2,4-di-tert-butylphenyl)-phosphite (Irgaphos 168 manufactured by Ciba Specialty Chemicals), tetrakis(2,4-di-tert-butylphenyl)4,4'-biphenylene-di-phosphonite (Sandostab P-EPQ manufactured by Sandoz), and bis(2,4-di-tert-butyl-6-methylphenyl)ethyl phosphite (Irgaphos 38 manufactured by Ciba Specialty Chemicals).

Preferred are tris(2,4-di-tert-butylphenyl)-phosphite (Irgaphos 168 manufactured by Ciba Specialty Chemicals) and tetrakis(2,4-di-tert-butylphenyl)4,4'-biphenylene-diphosphonite (Sandostab P-EPQ manufactured by Sandoz). More preferred is tris(2,4-di-tert-butylphenyl)-phosphite (Irgaphos 168 manufactured by Ciba Specialty Chemicals).

Examples of phenol-based antioxidants include pentaerythrityl-tetrakis[3-(3,5-di-tert-butyl-4-hydroxyphenyl)-propionate] (Irganox 1010 manufactured by Ciba Specialty Chemicals.), n-octadecyl-β-(3,5-di-tert-butyl-4-hydroxyphenyl)propionate (Irganox 1076 manufactured by Ciba Specialty Chemicals), tris(3,5-di-tert-butyl-4-hydroxybenzyl) isocyanurate (Irganox 3114 manufactured by Ciba Specialty Chemicals), tocopherol (vitamin E), 3,9-bis[2-{3-(3-tert-butyl-4-hydroxy-5-methylphenyl)propionyloxy}-1,1-dimethylethyl]-2,4,8,10-tetraoxaspiro[5,5]undecane (Sumilizer GA80 manufactured by Sumitomo Chemical Co., Ltd.), and 2,6-di-tert-butyl-4-methylphenol (BHT manufactured by Sumitomo Chemical Co., Ltd.)

Preferred are pentaerythritol-tetrakis[3-(3,5-di-tert-butyl-4-hydroxyphenyl)propionate] (Irganox 1010 (manufactured by Ciba Specialty Chemicals)), 3,9-bi[2-{3-(3-tert-butyl-4-hydroxy-5-methylphenyl)propionyloxy}-1,1-dimethylethyl]-2,4,8,10-tetraoxaspiro[5,5]undecane (Sumilizer GA80(manufactured by Sumitomo Chemical Co., Ltd.)) and 2,6-di-tert-butyl-4-methylphenol (BHT (manufactured by Sumitomo Chemical Co., Ltd.)). More preferred are pentaerythritol-tetrakis[3-(3,5-di-tert-butyl-4-hydroxyphenyl)propionate] (Irganox 1010 (manufactured by Ciba Specialty Chemicals)), 3,9-bi[2-{3-(3-tert-butyl-4-hydroxy-5-methylphenyl)propionyloxy}-1,1-dimethylethyl]-2,4,8,10-tetraoxaspiro[5,5]undecane (Sumilizer GA80(manufactured by Sumitomo Chemical Co., Ltd.)).

Examples of the sulfur-based antioxidant include pentaerythyl tetrakis(3-laurylthiopropionate), dilauryl 3,3'-thiodipropionate, dimyristyl 3,3'-thiodipropionate, and distearyl 3,3'-thiodipropionate.

Preferred are pentaerythyl tetrakis(3-laurylthiopropionate) and distearyl 3,3'-thiodipropionate. More preferred is distearyl 3,3'-thiodipropionate.

The propylene-based resin composition of the present invention may contain an anti-blocking agent, as needed. The anti-blocking agent is a substance capable of preventing a film or films from becoming to be unable to peel during its or their preservation or use due to self-sticking, adhesion or welding.

The anti-blocking agent used in the present invention includes inorganic anti-blocking agents and organic anti-blocking agents. Examples of the inorganic anti-blocking agents include natural silica, synthetic silica, talc, zeolite, kaolin, synthetic aluminasilicate, hydrotalcite-type compounds, calcium carbonate and magnesium oxide. Preferred are synthetic silica and synthetic aluminasilicate.

Examples of the organic anti-blocking agents include melanin-type compounds, fatty acid amide, polymer beads and silicone resin-based organic compounds. Preferred are polymer beads and silicone resin-based organic compounds.

The form of the anti-blocking agent used in the present invention is preferably an amorphous form whose anchor effect makes voids difficult to form. When a mother sheet for producing a stretched film is folded with nip rolls during the forming of the mother sheet, an anti-blocking agent serves as a nucleus to form voids and, as a result, white streaks may be formed (a phenomenon of blushing at folding may occur) in the film after stretching. Therefore, in view of blushing at folding, the above-mentioned amorphous form is preferred.

The bulk density of the anti-blocking agent used in the present invention is preferably from 0.01 to 0.55 g/cm$^3$, more preferably from 0.10 to 0.31 g/cm$^3$, and still more preferably from 0.12 to 0.28 g/cm$^3$ in view of blushing at folding.

The average particle diameter of the anti-blocking agent used in the present invention is preferably from 0.7 to 5.0 μm, more preferably from 0.8 to 3.0 μm, and still more preferably from 1.5 to 2.9 μm in view of blushing at folding.

The amount of the anti-blocking agent used in the present invention is preferably from 0.01 to 1.0 part by weight, and more preferably from 0.05 to 0.40 part by weight based on 100 parts by weight of the combination of the propylene-based polymers A and B. The anti-blocking agent may be used alone or in combination of at least two kinds.

The propylene-based resin composition of the present invention may contain a neutralizing agent, as needed. The neutralizing agent is a substance capable of acting on an acid substance remaining in a polymer to deactivate it.

Examples of the neutralizing agent used in the present invention include hydrotalcites, metal salts of higher fatty acids, silicates, metal oxides and metal hydroxides.

Examples of the hydrotalcites include hydrous basic carbonates or crystal-water-containing basic carbonates of magnesium, calcium, zinc, aluminum and bismuth. Further, these carbonates may be naturally occurring or synthetic products. In view of blushing at folding, preferred are DHT-4A and DHT-4C (both available from Kyowa Chemical Industry Co., Ltd.)

Examples of the metal salts of higher fatty acids include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate, and calcium montanate. Preferred are calcium stearate and magnesium stearate.

The amount of the neutralizing agent is preferably from 0.005 to 1.0 part by weight, and more preferably from 0.005 to 0.20 part by weight based on 100 parts by weight of the combination of the propylene-based polymers A and B. The neutralizing agent may be used alone or in combination of at least two kinds.

The propylene-based resin composition of the present invention may optionally contain additives, e.g. ultraviolet absorbers, lubricants, pigments, antistatic agents, copper inhibitors, flame retarders, foaming agents, plasticizers, cell inhibitors, crosslinking agents, flowability improving agent and light stabilizers.

When a composition is prepared from propylene-based polymers A and B and an additive or additives, the ingredients may be mixed simultaneously or sequentially. In addition, it is also possible to mix some ingredients simultaneously and mix other ingredients sequentially. For example, when propylene-based polymers A and B, which were produced separately in advance, are mixed, an additive or additives may be mixed at the same time as the mixing of the polymers. Alternatively, it is also possible to mix an additive or additives with a previously prepared resin composition of propylene-based polymers A and B. When two or more kinds of additives are mixed, these may be mixed simultaneously or sequentially. Such mixing can be carried out by used of a mixing device such as a Henschel mixer and a tumbler mixer.

When the above-mentioned propylene-based resin composition of the first aspect of the present invention contains a proper amount of a nucleating agent, the composition can yield a heat-shrinkable film which is superior in rigidity, heat shrinkage, weld-cut sealability and stretch processability and is superior also in transparency through stretch processing of the composition. The propylene-based resin composition of the first aspect which contains a proper amount of a nucleating agent is the propylene-based resin composition of the second aspect of the present invention.

That is, the propylene-based resin composition of the second aspect of the present invention is a propylene-based resin composition comprising from 20 to 99 parts by weight of a propylene-based polymer A satisfying requirements (A-1) and (A-2) mentioned previously, from 0.999 to 75 parts by weight of a propylene-based polymer B satisfying requirements (B-1) and (B-2) mentioned previously and from 0.001 to 5 parts by weight of a nucleating agent, provided that the sum of the amounts of the propylene-based polymer A, propylene-based polymer B and nucleating agent is 100 parts by weight, wherein a melting point $Tm^A$ of the propylene-based polymer A and a melting point $Tm^B$ of the propylene-based polymer B satisfy requirement (C) mentioned previously, wherein a melt flow rate $MFR^A$ of the propylene-based polymer A and a melt flow rate $MFR^B$ of the propylene-based polymer B satisfy requirement (D) mentioned previously, and wherein the propylene-based resin composition satisfies requirement (E-3) below as well as requirements (E-1) and (E-2) mentioned previously:

Requirement (E-3): A crystallization rate of the propylene-based resin composition is from 1 to 400 seconds.

This propylene-based resin composition of the second aspect will be described below. Explanation of the content which overlaps the explanation of the propylene-based resin composition of the first aspect which was made previously will be omitted.

The nucleating agent used in the present invention may be any of those generally known. Examples thereof include talc, magnesium nitrate, sodium benzoate, dibenzylidene sorbitol, dimethylbenzylidene sorbitol, 2,2-methylenebis(4, 6-di-tert-butylphenyl) sodium phosphate, aluminum hydroxydi-p-tert-butylbenzoate, poly(3-methyl-butene-1), poly(4-methyl-pentene-1), alkenylsilane, propylene-vinyl cyclohexane copolymers and HDPE (high density polyethylene). A single kind of nucleating agent may be used. Alternatively, two or more kinds of nucleating agents may also be used.

In terms of odor and blushing at folding, preferred are talc, 3-methyl-butene-1, propylene-vinylcyclohexane copolymers and HDPE, and HDPE is more preferable.

The content of the propylene-based polymer A in the propylene-based resin composition of the present invention is from 20 to 99 parts by weight, preferably from 50 to 98.5 parts by weight and more preferably from 90 to 99 parts by weight.

When the amount of the propylene-based polymer A is less than 20 parts by weight, the propylene-based resin composition may have an insufficient stretch processability. When the amount of the propylene-based polymer A is over 99 parts by weight, a resulting heat-shrinkable film may have an insufficient rigidity.

The content of the propylene-based polymer B in the propylene-based resin composition of the present invention is from 0.999 to 75 parts by weight, preferably from 1 to 50 parts by weight and more preferably from 2 to 40 parts by weight.

When the amount of the propylene-based polymer B is less than 0.999 parts by weight, a resulting heat-shrinkable film may have an insufficient rigidity. When the amount of the propylene-based polymer A is over 99 parts by weight, the propylene-based resin composition may have an insufficient stretch processability.

The content of the nucleating agent in the propylene-based resin composition of the present invention is from 0.001 to 5 parts by weight, preferably from 0.1 to 2 parts by weight and more preferably from 0.2 to 0.5 parts by weight.

When the amount of the nucleating agent is less than 0.001 parts by weight, a resulting heat-shrinkable film may have an insufficient weld-cut sealability. When the amount of the nucleating agent is over 5 parts by weight, the propylene-based resin composition may have an insufficient stretch processability.

The propylene-based resin composition of the present invention comprising the propylene-based polymer A, propylene-based polymer B and nucleating agent has a melt flow rate $MFR^C$ of from 0.3 to 20 g/10 min (Requirement (E-1)), preferably from 0.5 to 15 g/10 min, and more preferably from 1 to 10 g/10 min. When the propylene-based resin composition has a melt flow rate $MFR^C$ of less than 0.3 g/10 min, the resin composition in a molten state may have a high viscosity and the resin composition may show an insufficient flowability during its extrusion. When $MFR^C$ is over 20 g/10 min, formabilities, e.g. stretch processability, of the resin composition will be deteriorated.

The melt flow rate of the propylene-based resin composition of the present invention can be brought within the above-mentioned ranges by adjusting the melt flow rates and the amounts of propylene-based polymer A and propylene-based polymer B to be mixed.

The propylene-based resin composition of the present invention comprising the propylene-based polymer A, propylene-based polymer B and nucleating agent has a melting point $Tm^C$ of from 130 to 145° C. (Requirement (E-2)), preferably from 132 to 143° C., and more preferably from 133 to 142° C. When the propylene-based resin composition has a melt point $Tm^C$ higher than 145° C., the resin composition may have an insufficient stretch processability. When the propylene-based resin composition has a melt point $Tm^C$ lower than 130° C., a resulting heat-shrinkable film may have an insufficient rigidity.

The melting point of the propylene-based resin composition of the present invention can be brought within the above-mentioned ranges by adjusting the melting points and the amounts of propylene-based polymer A and propylene-based polymer B to be mixed.

The crystallization rate of the propylene-based resin composition of the present invention can be brought within the above-mentioned ranges by adjusting the amounts of propylene-based polymer A, propylene-based polymer B and a nucleating agent to be mixed.

The propylene-based resin composition of the present invention comprising the propylene-based polymer A, propylene-based polymer B and nucleating agent has a crystallization rate of from 1 to 400 seconds, preferably from 5 to 200 seconds, and more preferably from 20 to 150 seconds. When the crystallization rate of the propylene-based resin composition is over 400 seconds, a resulting heat-shrinkable film may have an insufficient transparency. When the crystallization rate of the propylene-based resin composition is less than 1 second, the propylene-resin composition may have an insufficient stretch processability.

The amount of a 20° C. xylene-soluble fraction (CXS) of the polypropylene resin composition of the present invention comprising the propylene-based polymer A, propylene-based polymer B and nucleating agent is preferably up to 4% by weight, more preferably up to 3.5% by weight, and still more preferably up to 3% by weight in view of simultaneous exhibition of preferable stretch processability, rigidity and heat shrinkage and also in view of anti-blocking property.

The process for producing the polypropylene resin composition of the present invention includes a process comprising producing the propylene-based polymer A and the propylene-based polymer B separately and mixing the propylene-based polymer A and the propylene-based polymer B, followed by mixing a nucleating agent, and a process comprising producing the propylene-based polymer A and the propylene-based polymer B in different stages by use of multi-stage polymerization having two or more stages, followed by mixing a nucleating agent.

The method for mixing the propylene-based polymer A, the propylene-based polymer B produced separately and the nucleating agent may be any method as long as it is possible to disperse polymer A, polymer B and the nucleating agent uniformly. Examples thereof include:

(1) a method comprising mixing polymer A, polymer B and a nucleating agent with a ribbon blender, a Henschel mixer, a tumbler mixer or the like, and melt kneading the mixture using an extruder or the like;

(2) a method comprising melt kneading and pelletizing separately polymer A and polymer B, mixing the pelletized polymer A, pelletized polymer B and a nucleating agent by a method the same as that described above, and then further melt kneading;

(3) a method comprising pelletizing polymer A and a nucleating agent together, melt kneading and pelletizing polymer B, mixing the pelletized polymer A containing the nucleating agent and the pelletized polymer B in the same manner as (1) above and further melt kneading the resulting mixture;

(4) a method comprising melt kneading and pelletizing polymer A, melt kneading and pelletizing polymer B and a nucleating agent together, mixing the pelletized polymer A and the pelletized polymer B containing the nucleating agent, and further melt kneading the resulting mixture.

(5) a method comprising melt kneading and pelletizing separately polymer A and polymer B, blending the pelletized polymer A, the pelletized polymer B and a nucleating agent by dry blending or the like, and then mixing directly with a film processing machine; and (6) a method comprising melt kneading and pelletizing separately polymer A and polymer B, feeding the pelletized polymer A, the pelletized polymer B and a nucleating agent separately and mixing them.

Furthermore, a method comprising preparing in advance a master batch which comprises 100 parts by weight of the propylene-based polymer B and from 1 to 99 parts by weight of the propylene-based polymer A, and mixing the master batch with appropriate amounts of propylene-based polymers A and B and nucleating agent so that the concentration of the propylene-based polymer A becomes a predetermined concentration.

In addition, when the propylene-based polymer A, the propylene-based polymer B produced separately and a nucleating agent are mixed, antioxidants, lubricants, anti-static agents, anti-blocking agents, various kinds of inorganic or organic fillers, and the like may be added.

When an anti-blocking agent is blended, the amount thereof is preferably from 0.01 to 1.0 part by weight, and more preferably from 0.05 to 0.40 part by weight based on 100 parts by weight of the combination of the propylene-based polymers A and B and the nucleating agent. The anti-blocking agent may be used alone or in combination of at least two kinds.

When a neutralizing agent is blended, the amount thereof is preferably from 0.005 to 1.0 part by weight, and more preferably from 0.005 to 0.20 part by weight based on 100 parts by weight of the combination of the propylene-based polymers A and B and the nucleating agent. The neutralizing agent may be used alone or in combination of at least two kinds.

The preparation of a propylene-based resin composition containing additives such as antioxidants may use a single screw extruder, a multiple screw extruder, e.g. a twin screw extruder, a kneading machine such as a Banbury mixer, heat rolls, a kneader, or the like.

The heat-shrinkable films of the present invention can be obtained by stretching the above-mentioned propylene-based resin compositions of the present invention at least uniaxially.

Regarding the heat shrinkage of the heat-shrinkable film of the present invention, the value of heat shrinkage obtained in a measurement in which a heat-shrinkable film is immersed in silicone oil at 110° C. for five seconds, with respect to at least uniaxial direction, is preferably not less than 5%, more preferably not less than 12%, and particularly preferably not less than 15%.

The method for producing the heat-shrinkable film of the present invention may, for example, be a method in which a mother film for stretching is formed from a propylene-based resin composition of the present invention by use of a melt extrusion forming machine and the mother film is then stretched.

The method for forming the mother film for stretching may be T-die casting, water-cooling inflation and the like.

The method for stretching the mother film for stretching may be uniaxial stretching, such as roll stretching, rolling and tenter transversally uniaxial stretching, biaxial stretching, such as tenter biaxial stretching and tubular biaxial stretching, and the like.

The stretch temperature is preferably from ambient temperature to a melting point of the copolymers used, and the stretch ratio is preferably from 2 to 10 times in both longitudinal and transverse directions. The stretch ratio in the longitudinal direction and that in the transverse direction may be the same or different and may be chosen optionally depending upon the application of the film to be produced. In addition, heat setting may be performed after the stretching.

EXAMPLES

The present invention will be described below concretely with reference to examples and comparative examples. However, the invention is not limited to these examples.
First Series First, examples relating to propylene-based resin compositions containing no nucleating agent are provided.

Measurements of physical properties in examples and comparative examples were carried out according to the methods described below.

(1) Melt Flow Rate (MFR, Unit: g/10 min)

Melt flow rate was measured at a temperature of 230° C. under an applied load of 2.16 kgf in accordance with JIS K7210.

(2) Melting Point (Tm, Unit: ° C.)

A differential scanning calorimeter (DSC-7 available from PerkinElmer, Inc.) was used. A propylene-based polymer or a polypropylene resin composition was hot press formed in advance. A material was preliminarily heated at 230° C. for 5 minutes. Thereafter, the pressure was increased up to a pressure of 50 kgf/cm$^2$ over 3 minutes and held at that value for 2 minutes. Then the material was cooled at 30° C. under a pressure of 30 kgf/cm$^2$ for 5 minutes, yielding a sheet. A 10 g of sample cut from the sheet was heat treated in a nitrogen atmosphere at 220° C. for 5 minutes, followed by cooling to 150° C. at a rate of 300° C./min, followed by holding at 150° C. for 1 minute, followed by cooling to 50° C. at a rate of 5° C./min, followed by holding at 50° C. for 1 minute. Then, the material was heated from 50° C. up to 180° C. at a rate of 5° C./min and a melting peak temperature obtained during this process was defined as a melting point (Tm(° C.)).

(3) Ethylene Content and 1-Butene Content (Unit: wt %)

The ethylene content and the 1-butene content (wt %) were determined by a calibration curve method using the absorbances of the characteristic absorptions assigned to a methyl group ($-CH_3$), a methylene group ($-CH_2-$) and an ethyl group ($-C_2H_5$) of an infrared spectrum obtained by measuring the infrared spectrum of the press sheet described in (2) above.

(4) Measurement of Amount of Eluted Resin by Temperature Rising Elution Fractionation Measurement was carried out using an apparatus shown below under conditions shown below.

Machine: CFC Model T150A manufactured by Mitsubishi Chemical Corp.

Detector: Magna-IR550 manufacture by Nicolet-Japan Corp.

Wavelength: data range 2982–2842 $cm^{-1}$

Column: UT-806M manufactured by Showa Denko K. K. Two columns

Solvent: o-Dichlorobenzene

Flow Rate: 60 ml/hour

Sample Concentration: 100 mg/25 ml

Amount of Sample Injected: 0.8 ml

Carry Conditions: After reducing the temperature at a rate of 1° C./min from 140° C. to 0° C., the sample was left stand for 30 minutes. Thereafter, elution was started with a 0° C. fraction.

(5) Amount of 20° C. Xylene-Soluble Fraction (CXS, Unit: wt %)

A 10 g of propylene-based polymer was dissolved in a 1000 ml of boiling xylene and then cooled slowly to 50° C. Subsequently, while stirring in an ice water, the mixture was cooled to 20° C. and left stand at 20° C. overnight. A precipitating polymer was removed by filtration. Xylene was evaporated from the filtrate and the residue was dried at 60° C. under reduced pressure to recover a polymer soluble in 20° C. xylene. Thus, the amount of xylene-soluble fraction was calculated.

(6) Film Processing (Tabletop Biaxial Stretch)

A resin composition obtained was extruded with a single screw extruder at a resin temperature of 230° C. and cooled with a cooling roll at 25° C., resulting in a sheet 350 μm in thickness. From this sheet, a 92 mm×92 mm sample was cut out, which was then stretched under stretch condition 1 shown below, resulting in a biaxially stretched film 15 μm in thickness.

Stretch Condition 1

Stretch machine: Tabletop biaxial stretch machine manufactured by Toyo Seiki Seisaku-Sho Co., Ltd.

Preliminary Heating Temperature: 115° C.

Stretch Temperature: 115° C.

Preliminary Heating Time: 3 minutes

Stretch ratio: 4×4 times

Stretch Speed: 1.8 m/min

Heat-Set Temperature: 115° C.

Heat-Set Time: 30 seconds

Heat-Set Relaxation: Not done (7) Film Processing (Tenter-type Sequential Biaxial Stretching Machine)

A resin composition obtained was extruded with a single screw extruder at a resin temperature of 230° C. and cooled with a cooling roll at 25° C., resulting in a sheet 350 μm in thickness. The sheet was then stretched with a tenter-type sequential biaxial stretching machine under stretch condition 2 shown below, resulting in a biaxially stretched film 15 μm in thickness.

Stretch Condition 2

Stretch Machine: Tenter-type Sequential Biaxial Stretching Machine manufactured by Mitsubishi Heavy Industries, Ltd.

Longitudinal Stretch Temperature: 120° C.

Longitudinal Stretch Ratio: 4 times

Transverse Preliminary Heating Temperature: 130° C.

Transverse Stretch Temperature: 125° C.

Transverse Stretch Ratio: 4 times

Rate of Film Take-up: 14.5 m/min (8) Young's Modulus (Unit: $kg/cm^2$)

A specimen 20 mm in width was cut out from the film obtained under stretch condition 1 along the transverse direction (TD). An S-S curve thereof was measured at an inter-clip distance of 60 mm and a tensile rate of 5 mm/min using a tensile tester to obtain an initial elastic modulus.

(9) Heat Shrinkage (Unit: %)

A square film specimen whose sides had a length of 90 mm was cut out from the film obtained under stretch condition 1 and a marked line was drawn along the TD direction. The specimen was immersed in silicone oil at 110° C. for 5 seconds and then removed therefrom. After cooling at room temperature for 30 minutes, the length of the marked line on the specimen was measured. The heat shrinkage was calculated using the following equation:

Heat shrinkage=100×{(90−length of marked line after heating)/90}

(10) Weld-cut Seal Strength (Unit: N)

A specimen 25 mm in width was cut out from the film obtained under stretch condition 2 along the longitudinal direction (MD). After weld cutting of the specimen at 250° C. using an automatic hot tack tester equipped with a weld-cut seal bar available from Theller, a tensile stress-strain curve was measured at a tensile rate of 5 mm/min with an automatic tensile tester to obtain a rupture strength.

(11) Stretch Processability (Unit: $Kg/cm^2$)

A tensile stress-strain curve was measured during the stretching under stretch condition 1 to obtain a stretch stress when the stretch ratio was 1.5 times in both directions. A smaller stretch stress indicates a better stretch processability.

Example 1

Preparation of Propylene-based Polymer A1

A copolymer powder of a propylene-based polymer A1 was obtained by copolymerizing propylene, ethylene and 1-butene by gas phase polymerization (catalyst conditions: Al/Ti molar ratio=600, cyclohexylethyldimethoxysilane(Z)/Ti molar ratio=40; polymerization conditions: polymerization temperature=81° C., polymerization pressure=2.1 MPa) in the presence of a catalyst system described in JP, 7-216017,A. The resulting propylene-based polymer A1 is a polymer such that the melt flow rate $MFR^{A1}$ is 3.5, the melting point $Tm^{A1}$, which is defined as a peak temperature of a peak with a maximum intensity in a melting curve measured by DSC, is 134° C., the ethylene content is 2.5% by weight, the 1-butene content is 6.7% by weight, the amount of the resin eluted at temperatures not higher than 40° C. in temperature rising elution fractionation using orthodichlorobenzene as a solvent is 4.6% by weight and the amount of the resin eluted at temperatures higher than 40° C. and not higher than 100° C. is 95.4% by weight and the amount of the resin eluted at temperatures higher than 100° C. and not higher than 130° C. is 0% by weight.

Preparation of Propylene-Based Polymer B1

A propylene homopolymer powder of a propylene-based polymer B1 was obtained by polymerizing propylene alone by gas phase polymerization (catalyst conditions: Al/Ti molar ratio=450, cyclohexylethyldimethoxysilane(Z)/Ti molar ratio=8; polymerization conditions: polymerization temperature=83° C., polymerization pressure=2.1 MPa) in the presence of a catalyst system described in JP, 7-216017, A. The resulting propylene-based polymer B1 is a polymer such that the melt flow rate $MFR^{B1}$ is 120 g/10 min, the melting point $Tm^{B1}$, which is defined as a peak temperature of a peak with a maximum intensity in a melting curve measured by DSC, is 165° C., the amount of the xylene-soluble fraction is 0.8% by weight, and neither ethylene nor 1-butene is contained.

To 95% by weight of the propylene-based polymer A1 mentioned above; and 5% by weight of the propylene-based polymer B1 mentioned above; 0.05 part by weight of Irganox 1010, 0.10 part by weight of Irgaphos 168 and 0.05 part by weight of calcium stearate were added and mixed with a Henschel mixer under a nitrogen atmosphere. Then, the mixture was melt-extruded and pelletized, resulting in resin composition C1 such that the melt flow rate $MFR^C$ is 4.2 g/10 min, the melting point $Tm^{C1}$ is 136° C. and the amount of the xylene-soluble fraction is 2.2% by weight, in a state of pellets. Subsequently, the resulting pellets were subjected to stretching under stretch condition 1 and stretch condition 2, respectively, to obtain biaxially stretched films 15 μm in thickness. The physical property values and stretch processabilities of the resulting films are shown in Table 3.

Examples 2 and 3

Films were obtained using additive recipes, kneading methods and film forming methods similar to those employed in Example 1 except using, in Example 2, propylene-based polymer B2 shown in Table 1 and using, in Example 3, propylene-based polymer B3 shown in Table 1. The compositions of the mixtures obtained by kneading are shown in Table 2. The physical property values and stretch processabilities of the resulting films are shown in Table 3.

Example 4

In Example 4, a film was obtained using an additive recipe, a kneading method and a film forming method similar to those employed in Example 1 except using propylene-based polymer B2 shown in Table 1 and changing the amount of ingredients blended. The composition of the mixture obtained by kneading is shown in Table 2. The physical property values and stretch processability of the resulting film are shown in Table 3.

Example 5

In Example 5, a film was obtained using an additive recipe, a kneading method and a film forming method similar to those employed in Example 1 except using propylene-based polymer A2 and propylene-based polymer B4 shown in Table 1 and changing the amount of ingredients blended. The composition of the mixture obtained by kneading is shown in Table 2. The physical property values and stretch processability of the resulting film are shown in Table 3.

Comparative Example 1

In Comparative Example 1, a film was obtained using an additive recipe, a kneading method and a film forming method similar to those employed in Example 1 except using propylene-based polymer A2 and propylene-based polymer B5 shown in Table 1 and changing the amount of ingredients blended. The composition of the mixture obtained by kneading is shown in Table 2. The physical property values and stretch processability of the resulting film are shown in Table 3.

Comparative Example 2

In Comparative Example 2, a film was obtained using an additive recipe, a kneading method and a film forming method similar to those employed in Example 1 except using propylene-based polymer A3 and propylene-based polymer B1 shown in Table 1 and changing the amount of ingredients blended. The composition of the mixture obtained by kneading is shown in Table 2. The physical property values and stretch processability of the resulting film are shown in Table 3.

Comparative Example 3

In Comparative Example 3, a film was obtained using an additive recipe, a kneading method and a film forming method similar to those employed in Example 1 except using propylene-based polymer A4 and propylene-based polymer B6 shown in Table 1 and changing the amount of ingredients blended. The composition of the mixture obtained by kneading is shown in Table 2. The physical property values and stretch processability of the resulting film are shown in Table 3.

TABLE 1

| Polymer | MFR (g/10 min) | Tm (° C.) | Ethylene Content (wt %) | 1-Butene Content (wt %) | CXS (wt %) |
|---|---|---|---|---|---|
| A1 | 3.5 | 134 | 2.5 | 6.7 | 2.3 |
| A2 | 2.7 | 134 | 5.5 | 0 | 6.2 |
| A3 | 7.2 | 141 | 2.1 | 4.8 | 1.7 |
| A4 | 6.2 | 136 | 2.1 | 5.6 | 1.9 |
| B1 | 120 | 165 | 0 | 0 | 0.8 |
| B2 | 21 | 165 | 0 | 0 | 0.8 |
| B3 | 190 | 139 | 2.1 | 5.6 | 2.0 |
| B4 | 22 | 141 | 4.0 | 0 | 3.5 |
| B5 | 6 | 142 | 4.0 | 0 | 2.9 |
| B6 | 350 | 166 | 0 | 0 | 0.6 |

TABLE 2

| | Ingredient (part by weight) | | | |
|---|---|---|---|---|
| | Polymer A | Polymer B | $Tm^A/Tm^B$ | $MFR^A/MFR^B$ |
| Example 1 | A1 (95) | B1 (5) | 0.81 | 0.029 |
| Example 2 | A1 (95) | B2 (5) | 0.81 | 0.167 |
| Example 3 | A1 (95) | B3 (5) | 0.96 | 0.964 |
| Example 4 | A1 (80) | B4 (20) | 0.95 | 0.159 |
| Example 5 | A2 (60) | B4 (40) | 0.95 | 0.123 |
| Comparative Example 1 | A2 (40) | B5 (60) | 0.94 | 0.45 |
| Comparative Example 2 | A3 (95) | B1 (5) | 0.85 | 0.06 |

TABLE 2-continued

| | | | |
|---|---|---|---|
| Comparative Example 3 | A4 (95) | B6 (5) | 0.82 | 0.018 |

| | Properties of Resin Composition C | | |
|---|---|---|---|
| | MFR (g/10 min) | Tm (° C.) | CXS (wt %) |
| Example 1 | 4.2 | 136 | 2.2 |
| Example 2 | 3.8 | 136 | 2.2 |
| Example 3 | 4.3 | 134 | 2.3 |
| Example 4 | 4.2 | 135 | 2.4 |
| Example 5 | 6.3 | 137 | 5.1 |
| Comparative Example 1 | 3.7 | 137 | 4.9 |
| Comparative Example 2 | 8.3 | 142 | 1.7 |
| Comparative Example 3 | 7.6 | 138 | 1.8 |

TABLE 3

| | Properties of Heat-Shrinkable Film | | | |
|---|---|---|---|---|
| | Young's Modulus (kg/cm$^2$) | Heat Shrinkage (%) | Weld-cut Seal Strength (N) | Stretch Stress (kg/cm$^2$) |
| Example 1 | 12300 | 20 | 3.2 | 3.8 |
| Example 2 | 12600 | 20 | 3.3 | 3.9 |
| Example 3 | 12100 | 20 | 3.1 | 3.7 |
| Example 4 | 12700 | 21 | 3.0 | 3.8 |
| Example 5 | 11200 | 20 | 4.9 | 3.9 |
| Comparative Example 1 | 10200 | 22 | 3.3 | 4.0 |
| Comparative Example 2 | 14200 | 19 | 1.7 | 4.7 |
| Comparative Example 3 | 14500 | 16 | 1.9 | 4.6 |

The heat-shrinkable films described in Examples 1 to 5, which satisfy the requirements of the present invention, are superior in Young's modulus, heat shrinkage, weld-cut seal strength and stretch processability, whereas Comparative Example 1 is insufficient in Young's modulus because the MFR of copolymer B, which is one of the requirements of the present invention, is not satisfied. In Comparative Example 2, the stretch processability is insufficient because the Tm of copolymer A, which is one of the requirements of the present invention, is not satisfied. In Comparative Example 3, the stretch processability is insufficient because the MFR of copolymer B, which is one of the requirements of the present invention, is not satisfied.

Second Series

Examples relating to propylene-based resin compositions containing a nucleating agent are provided.

Measurements of physical properties in examples and comparative examples were carried out according to the methods described below.

(1) Melt Flow Rate (MFR, Unit: g/10 min)

Melt flow rate was measured under the same conditions as those used in First Series.

(2) Melting Point (Tm, Unit: ° C.)

Melting point was measured under the same conditions as those used in First Series.

(3) Ethylene Content and 1-Butene Content (Unit: wt %)

The ethylene content and the 1-butene content (wt %) were determined under the same conditions as those used in First Series.

(4) Measurement of Amount of Eluted Resin by Temperature Rising Elution Fractionation Measurement was carried out under the same conditions as those used in First Series.

(5) Amount of 20° C. Xylene-Soluble Fraction (CXS, Unit: wt %)

Measurement of CXS was carried out under the same conditions as those used in First Series.

(6) Crystallization Rate (Unit: Second)

Using a crystallization rate measuring apparatus by a polarized light intensity method (Model MK-701 manufactured by Kotaki Mfg. Co. Ltd.), a press sheet prepared in the melting point measurement described in the above (2) was sandwiched between cover glasses and melted in a fusion furnace held at 230° C. Subsequently, the sample sandwiched between the cover glasses was transferred into a light path in a 110° C. oil bath so that the crystallization was commenced. Thus, an increasing light transmitted through the analyzer was detected and recorded. The time taken until the change in intensity of the transmitted light became half was read from the chart recorded and the time was used as the crystallization rate, which is indicated in second.

(7) Film Processing (Tenter-type Sequential Biaxial Stretching Machine)

A resin composition was stretched under Condition 2 described in the paragraph "(7) Film Processing" in First Series, obtaining a biaxially stretched film 15 μm in thickness.

(8) Haze (Unit: %)

The haze of a film obtained under stretch condition 2 was measured in accordance with ASTM D-1003.

(9) Young's Modulus (Unit: kg/cm$^2$)

Using a film obtained under stretch condition 2, the Young' modulus (initial elastic modulus) was measured in the same conditions as those used in First Series.

(10) Heat Shrinkage (Unit: %)

Using a film obtained under stretch condition 2, the heat shrinkage was measured under the same conditions as those used in First Series.

(11) Weld-cut Seal Strength (Unit: N)

Using a film obtained under stretch condition 2, the weld-cut seal strength (strength at break) was measured under the same conditions as those used in First Series.

(12) Stretch Processability (Visual Evaluation)

The appearance of a film resulting from stretching under stretch condition 2 was evaluated visually. When a film with a good appearance with no uneven stretch was obtained, it was judged that the stretch processability was good. When a film was torn during stretching or a film was unevenly stretched and as a result a film with a poor appearance was obtained, it was judged that the stretch processability was poor.

Pelletization of Copolymer Powder of Propylene-based Polymer A1

Pellets A1 of propylene-based polymer A1 were prepared by adding 0.01 part by weight of hydrotalcite as a neutralizing agent, 0.05 part by weight of an antioxidant available as Irganox 1010 (supplied by Ciba Specialty Chemicals), 0.15 part by weight of another antioxidant available as Irgaphos 168 (supplied by Ciba Specialty Chemicals) and 0.1 parts by weight of cubic aluminosilicate having a particle size of 2 μm as an antiblocking agent to 100 parts by weight of copolymer powder of propylene-based polymer A1 produced in Example 1 and then melt kneading at 230° C. The resulting pellets A5 were pellets such that the melt flow rate MFR$^{A1}$ is 2.7 g/10 min, the ethylene content is 2.5% by weight, the 1-butene content is 6.7% by weight, the melting point $Tm^A$ is 132.4° C., the amount of the resin eluted at temperatures not higher than 40° C. in temperature raising elution fractionation using orthodichlorobenzene as a solvent is 4.6% by weight and the amount of the resin eluted at temperatures higher than 40° C. but not higher than 100° C. is 95.4% by weight and the amount of the resin eluted at temperatures higher than 100° C. but not higher than 130° C. is 0% by weight.

Pelletization of Copolymer Powder of Propylene-based Polymer B1

Pellets B1 of propylene-based polymer B1were prepared by adding 0.01 part by weight of hydrotalcite as a neutralizing agent and 0.125 part by weight of an antioxidant available as Irganox 1010 (supplied by Ciba Specialty Chemicals) to 100 parts by weight of propylene homopolymer powder of propylene-based polymer B1produced in Example 1 and then melt kneading at 230° C. The resulting pellets B1 were pellets such that the melt flow rate $MFR^B$ is 120 g/10 min, the melting point $Tm^B$ is 165.0° C. and the amount of the xylene-soluble fraction is 0.8% by weight.

Example 6

97.7% By weight of propylene-based polymer A1, 2% by weight of propylene-based polymer B1 and 0.3% by weight of HDPE (polyethylene G1900 supplied by KEIYO, MFR measured at 190° C.=16.0 g/10 min, density=0.956 g/ml) were mixed with a Henschel mixer and then melt-extruded, thereby being pelletized. The composition of the resulting pellets is shown in Table 4. The pellets have a melt flow rate $MFR^C$ of 2.9 g/10 min, a melting point $Tm^C$ of 135.6° C., an amount of the xylene-soluble fraction of 2.2% by weight and a crystallization rate of 138 seconds. Subsequently, the resulting pellets were subjected to stretching under stretch condition 2, yielding a biaxially stretched film 15 μm in thickness. The physical property values and stretch processability of the resulting film are shown in Table 5.

Referential Example 1

In Referential Example 1, a film was obtained using an additive recipe, a kneading method and a film forming method similar to those employed in Example 6 except adding no HDPE. The composition of the mixture obtained by kneading is shown in Table 4. The physical property values and stretch processability of the resulting film are shown in Table 5.

Comparative Example 4

In Comparative Example 4, a film was obtained using an additive recipe, a kneading method and a film forming method similar to those employed in Example 6 except adding no propylene-based polymer B1. The composition of the mixture obtained by kneading is shown in Table 4. The physical property values and stretch processability of the resulting film are shown in Table 5.

Comparative Example 5

In Comparative Example 5, a film was obtained using an additive recipe, a kneading method and a film forming method similar to those employed in Example 6 except adding neither propylene-based polymer B1 nor HDPE. The composition of the mixture obtained by kneading is shown in Table 4. The physical property values and stretch processability of the resulting film are shown in Table 5.

TABLE 4

| | Amount of Ingredient (part by weight) | | | | |
|---|---|---|---|---|---|
| | Polymer A1 | Polymer B1 | Nucleating Agent | $Tm^A/Tm^B$ | $MFR^A/MFR^B$ |
| Example 6 | 97.7 | 2.0 | 0.3 | 0.81 | 0.023 |
| Referential Example 1 | 98.0 | 2.0 | 0 | 0.81 | 0.023 |
| Comparative Example 4 | 99.7 | 0 | 0.3 | No data | No data |
| Comparative Example 5 | 100 | 0 | 0 | No data | No data |

| | Properties of Resin Composition | | | |
|---|---|---|---|---|
| | MFR (g/10 min) | Tm (° C.) | CXS (%) | Crystallization Rate (second) |
| Example 6 | 4.3 | 135.6 | 2.2 | 138 |
| Referential Example 1 | 4.0 | 134.6 | 2.3 | 448 |
| Comparative Example 4 | 3.9 | 133.8 | 2.4 | 263 |
| Comparative Example 5 | 2.8 | 132.4 | 2.3 | 653 |

TABLE 5

| | Properties of Heat-Shrinkable Film | | | | |
|---|---|---|---|---|---|
| | Haze (%) | Young' Modulus (MPa) | Heat Shrinkage (%) | Weld-cut Seal Strength (N) | Stretch Processability |
| Example 6 | 0.9 | 1890 | 13.7 | 9.9 | Good |
| Referential Example 1 | 2.3 | 1980 | 14.6 | 4.8 | Good |
| Comparative Example 4 | 0.9 | 1820 | 14.7 | 11.1 | Good |
| Comparative Example 5 | 0.9 | 1820 | 15.2 | 4.2 | Good |

Example 6, which satisfies the requirements of the present invention, is superior in transparency, Young's modulus, heat shrinkage, weld-cut seal strength and stretch processability, and in particular, is superior to Referential Example 1, which contains no nucleating agent, in transparency and weld-cut seal strength. Comparative Example 4, which does not contain copolymer B, which is one of the requirements of the present invention, is insufficient in Young's modulus. Comparative Example 5, which does not contain copolymer B or nucleating agent, both of which are requirements of the present invention, is insufficient in Young' modulus and weld-cut seal strength.

As described above in detail, the present invention affords heat-shrinkable films superior in rigidity, heat shrinkage, weld-cut sealability and stretch processability and propylene-based resin compositions which can yield those heat-shrinkable films with superior properties.

What is claimed is:

1. A propylene-based resin composition comprising from 20 to 99 parts by weight of a propylene-based polymer A satisfying requirements (A-1) and (A-2) below and from 1 to 80 parts by weight of a propylene-based polymer B satisfying requirements (B-1) and (B-2) below, provided that the sum of the amounts of the propylene-based polymer A and the propylene-based polymer B is 100 parts by weight, wherein a melting point $Tm^A$ of the propylene-based polymer A and a melting point $Tm^B$ of the propylene-based polymer B satisfy requirement (C) below, wherein a melt flow rate $MFR^A$ of the propylene-based. polymer A and a melt flow rate $MFR^B$ of the propylene-based polymer B satisfy requirement (D) below, and wherein the propylene-based resin composition satisfies requirements (E-1) and (E-2) below:

Requirement (A-1): A melt flow rate $MFR^A$ is from 0.3 to 20 g/10 minutes;

Requirement (A-2): A melting point $Tm^A$, which is defined as a peak temperature of a peak with a maximum intensity in a melting curve measured by DSC, is from 125 to 140° C.;

Requirement (B-1): A melt flow rate $MFR^B$ is from 21 to 200 g/10 minutes;

Requirement (B-2): A melting point $Tm^B$, which is defined as a peak temperature of a peak with a maximum intensity in a melting curve measured by DSC, is from 135 to 170° C.;

Requirement (C): A ratio of the melting point $Tm^A$ of the propylene-based polymer A to the melting point $Tm^B$ of the propylene-based polymer B, $Tm^A/Tm^B$, is less than 1;

Requirement (D): A ratio of the melt flow rate $MFR^A$ of the propylene-based polymer A to the melt flow rate $MFR^B$ of the propylene-based polymer B, $MFR^A/MFR^B$, is $0.01 < MFR^A/MFR^B < 1$;

Requirement (E-1): A melt flow rate $MFR^C$ of the propylene-based resin composition is from 0.3 to 20 g/10 minutes; and Requirement (E-2): A melting point $Tm^C$, which is defined as a peak temperature of a peak with a maximum intensity in a melting curve measured by DSC, of the propylene-based resin composition is from 130 to 145° C.

2. The propylene-based resin composition according to claim 1, wherein the propylene-based polymer A is a propylene-ethylene-α-olefin random copolymer that has a propylene content of from 63 to 98.9% by weight, an ethylene content of from 0.1 to 7% by weight, an α-olefin content of from 1 to 30% by weight and a melting point $Tm^A$ of from 125 to 140° C.

3. A propylene-based resin composition comprising from 20 to 99 parts by weight of a propylene-based polymer A satisfying requirements (A-1) and (A-2) below, from 0.999 to 75 parts by weight of a propylene-based polymer B satisfying requirements (B-1) and (B-2) below and from 0.001 to 5 parts by weight of a nucleating agent, provided that the sum of the amounts of the propylene-based polymer A, the propylene-based polymer B and the nucleating agent is 100 parts by weight, wherein a melting point $Tm^A$ of the propylene-based polymer A and a melting point $TM^B$ of the propylene-based polymer B satisfy requirement (C) below, wherein a melt flow rate $MFR^A$ of the propylene-based polymer A and a melt flow rate $MFR^B$ of the propylene-based polymer B satisfy requirement (D) below, and wherein the propylene-based resin composition satisfies requirements (E-1) and (E-3) below:

Requirement (A-1): A melt flow rate $MFR^A$ is from 0.3 to 20 g/10 minutes;

Requirement (A-2): A melting point $Tm^A$, which is defined as a peak temperature of a peak with a maximum intensity in a melting curve measured by DSC, is from 125 to 140° C.;

Requirement (B-1): A melt flow rate $MFR^B$ is from 21 to 200 g/10 minutes;

Requirement (B-2): A melting point $Tm^B$, which is defined as a peak temperature of a peak with a maximum intensity in a melting curve measured by DSC, is from 135 to 170° C.;

Requirement (C): A ratio of the melting point $Tm^A$ of the propylene-based polymer A to the melting point $Tm^B$ of the propylene-based polymer B, $Tm^A/Tm^B$, is less than 1;

Requirement (D): A ratio of the melt flow rate $MFR^A$ of the propylene-based polymer A to the melt flow rate $MFR^B$ of the propylene-based polymer B, $MFR^A/MFR^B$, is $0.01 < MFR^A/MFR^B < 1$;

Requirement (E-1): A melt flow rate $MFR^C$ of the propylene-based resin composition is from 0.3 to 20 g/10 minutes;

Requirement (E-2): A melting point $Tm^C$, which is defined as a peak temperature of a peak with a maximum intensity in a melting curve measured by DSC, of the propylene-based resin composition is from 130 to 145° C.; and Requirement (E-3): A crystallization rate of the propylene-based resin composition is from 1 to 400 seconds.

4. The propylene-based resin composition according to claim 3, wherein the propylene-based polymer A is a propylene-ethylene-α-olefin random copolymer that has a propylene content of from 63 to 98.9% by weight, an ethylene content of from 0.1 to 7% by weight, an α-olefin content of from 1 to 30% by weight and a melting point $Tm^A$ of from 125 to 140° C.

5. A heat-shrinkable film obtained by stretching at least uniaxially the propylene-based resin composition according to claim 1 or 2.

6. A heat-shrinkable film obtained by stretching at least uniaxially the propylene-based resin composition according to claim 3 or 4.

* * * * *